United States Patent
Eakin

(10) Patent No.: US 10,132,673 B1
(45) Date of Patent: Nov. 20, 2018

(54) LIVESTOCK WEIGHT MARKING SYSTEM

(71) Applicant: Osborne Industries, Inc., Osborne, KS (US)

(72) Inventor: George R. Eakin, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 157 days.

(21) Appl. No.: 15/269,914

(22) Filed: Sep. 19, 2016

Related U.S. Application Data

(60) Provisional application No. 62/220,902, filed on Sep. 18, 2015.

(51) Int. Cl.
| | | |
|---|---|---|
| *A01K 1/00* | (2006.01) | |
| *A01K 11/00* | (2006.01) | |
| *G01G 1/26* | (2006.01) | |
| *G01G 21/18* | (2006.01) | |
| *G01G 21/22* | (2006.01) | |
| *G01G 21/23* | (2006.01) | |
| *G01G 17/08* | (2006.01) | |
| *A01K 1/06* | (2006.01) | |

(52) U.S. Cl.
CPC .......... *G01G 17/08* (2013.01); *A01K 1/0023* (2013.01); *A01K 1/0613* (2013.01); *A01K 11/005* (2013.01); *G01G 1/26* (2013.01); *G01G 21/18* (2013.01); *G01G 21/22* (2013.01); *G01G 21/23* (2013.01)

(58) Field of Classification Search
CPC .... A01K 1/0023; A01K 1/0613; A01K 11/00; A01K 11/005; G01G 17/08; G01G 21/18; G01G 21/22; G01G 21/23; G01G 1/26
See application file for complete search history.

(56) References Cited

U.S. PATENT DOCUMENTS

| 446,309 | A | * | 2/1891 | West | ........................ | G01G 1/26 |
| | | | | | | 177/252 |
| 3,038,549 | A | * | 6/1962 | Thompson | ............. | G01G 17/08 |
| | | | | | | 177/246 |
| 3,074,497 | A | * | 1/1963 | Hawbaker | ............... | G01G 17/08 |
| | | | | | | 177/246 |
| 4,138,968 | A | * | 2/1979 | Ostermann | ........... | A01K 1/0613 |
| | | | | | | 119/842 |

(Continued)

OTHER PUBLICATIONS

Bernard Peet, "For Pigs, Size Really Does Matter", Jun. 20, 2003, www.thepigsite.com/articles/884/for-pigs-size-does-matter.

*Primary Examiner* — Randy Gibson
(74) *Attorney, Agent, or Firm* — Jeffrey L. Thompson; Thompson & Thompson, P.A.

(57) ABSTRACT

A livestock management system is provided that spray marks animals for sorting or market weight selection. The system includes a pen area partitioned into a feeding area containing at least one feeder and a common watering area containing at least one waterer. A walk-through scale has an inlet open to the watering area and an outlet open to the feeding area. The walk-through scale has a weighing device that determines if the animal is within the specified set weight for marking. The weighing device determines the weight of the animal as the animal center of mass crosses the center of the weighing platform. The system allows spray marking of the animal to be done in a stress free environment that improves overall growth potential.

20 Claims, 7 Drawing Sheets

(56) References Cited

U.S. PATENT DOCUMENTS

| | | | | |
|---|---|---|---|---|
| 4,286,679 | A | * | 9/1981 | Schneider .............. G01G 17/08 177/132 |
| 4,347,903 | A | * | 9/1982 | Yano ...................... G01G 17/08 177/185 |
| 4,440,078 | A | * | 4/1984 | McCrery, Jr. ........ A01K 11/005 101/26 |
| 4,533,008 | A | * | 8/1985 | Ostermann ............ G01G 21/18 177/132 |
| 4,850,441 | A | * | 7/1989 | Mosdal .................. G01G 17/08 177/136 |
| 4,984,644 | A | * | 1/1991 | Skibinski ............... G01G 17/08 177/132 |
| 5,207,284 | A | * | 5/1993 | Douglas ............... G01G 21/283 177/165 |
| 5,790,047 | A | * | 8/1998 | Golan .................. A01K 11/006 340/10.42 |
| 6,264,637 | B1 | * | 7/2001 | Hogan ................... A01K 11/00 604/191 |
| 6,521,847 | B1 | | 2/2003 | Ostermann |
| 6,838,625 | B2 | | 1/2005 | Ostermann |
| 6,901,885 | B1 | * | 6/2005 | Kleinsasser .......... A01K 11/005 119/842 |
| 6,997,140 | B2 | * | 2/2006 | Finlayson .............. A01K 11/00 119/840 |
| 7,210,428 | B2 | | 5/2007 | Thibault |
| 7,598,463 | B2 | * | 10/2009 | Kleinsasser ........... G01G 17/08 119/842 |
| 8,584,619 | B2 | | 11/2013 | Eakin et al. |

\* cited by examiner

LIVESTOCK WEIGHT MARKING SYSTEM

RELATED APPLICATIONS

This application claims the benefit of U.S. Provisional Patent Application No. 62/220,902 filed on Sep. 18, 2015. The entire content of this related application is incorporated herein by reference.

BACKGROUND OF THE INVENTION

Field of the Invention

The present invention relates generally to livestock production management systems, and in particular, to systems and methods for automatically marking a market animal based on a detected weight of the animal.

Description of the Related Art

Meat packers and their customers are demanding the production and delivery of market animals with weights that must meet progressively tighter windows for acceptable weights. Marketing animals whose weights fall outside the specified weight ranges usually results in significant deductions from market prices for such underweight or overweight animals.

Historically pig producers selected animals for market by simple visual inspection, relying on pig judging skills to identify market animals. Such methods are neither sufficiently accurate nor reliably consistent for modern markets. The use of single-animal farm scales, such as the Osborne Industries ACCU-ARM scale, is sufficiently accurate to select animals for market. Using such scales has been shown to amply reward the user with a profitable payback at market for both the cost of equipment and labor for weighing. However, the method of individually sorting and weighing animals requires substantial labor and time, two commodities that are often unavailable in modern finishing operations. Furthermore, sorting and weighing animals that fail to meet the marketing range always causes stress and a temporary, but costly interruption to their normal growth. If large numbers of animals must be inspected, the use of single-animal scales is simply too slow to be practical.

The pig production industry is losing quality labor which is capable of visually selecting animals by weight and size, therefore, an automated and accurate sorting method is needed.

For automated weighing to be feasible, the cost of equipment and maintenance must be spread over a large number of animals. This consideration leads naturally to the conclusion that managing finishing pigs in large pens is highly desirable.

Other automated sorting systems have been developed and used in the past with only limited success. The "food court" sorting system essentially groups all of the feeders into a relatively small area of the finishing room. The remainder of the finishing room is reserved as a loafing area without feeders. Both the food court and the loafing areas are provided with water.

Several weeks prior to marketing with the food court system, a sorting scale is moved into position and pigs must enter the food court through a sorting scale in order to be fed, and then return to the loafing area via one-way gates. At some point, a sort weight or weight range is assigned to the sort scale, and the food court is divided into a market animal pen and a reject pen for pigs outside the sort range. The reject pigs can return to the loafing area via a one-way gate, but the market animals are prohibited from remixing in the loafing area by locking the one-way exit gates. After about 24-hours, the market animals are loaded out and the pen is returned to normal operation. The sort off of market animals is repeated until all animals have been selected for specific markets or fed out to meet the target ranges set earlier.

The food court system has several distinct disadvantages. For example, because the food court provides both food and water in a very compact area, the dominant pigs in the group have no incentive to leave and can easily control access to the feeders and intimidate less aggressive pigs. This type of dominant behavior is most easily seen in adult sows, but exists with adolescent pigs as well.

The food court arrangement almost ensures a wider spread of weights in the group and a longer time to market with higher facilities utilization costs.

Moreover, the automatic market scale of the food court system is used in such a way that very accurate weights are required with pigs on one pass through the scale. The pigs must be accurately separated, weighed, and then released into the market pen. Moving across such a scale with multiple moving gates requires training. Training occurs because feed is the incentive. This means that feed restriction is a necessary consequence for this training, often in the final weeks prior to market when extending the market date is least affordable.

Automatic marketing scales and the food court system both combine to increase facilities utilization costs because increasing the number of "tail-enders" is a necessary outcome for this system.

To overcome the problems mentioned above, Osborne Industries designed and developed a livestock management system described in U.S. Pat. No. 7,210,428 titled "Livestock Management System and Method for Split-Weight Feeding Based on Median Weight of Herd." This system was designed to be fully automated and will accommodate both small and large pens of growing pigs. However, this system requires large number of pigs in a pen to be economically feasible. If there are too few of growing pigs in the livestock management system disclosed in the '428 patent, the investment per animal in the equipment may be too large, and payback for the equipment may be too long for the customer.

Also, there are many pig production farms that do not have adequate production of these required large numbers of growing pigs and therefore continue to grow pigs in smaller groups of 30-60 animals per pen. This management style requires less upfront investment in equipment, but requires more labor (approximately 3 times per year per pen) to sort and move animals ready for market. This time and labor does not take into account the additional financial losses experienced by the farm for the interruption in animal growth that occurs with non-selected animals.

Thus, there is a need in the industry for an improved livestock weight marking system for small pen sizes that increases marking accuracy in a stress-free environment and overcomes the problems of the prior art described above.

SUMMARY OF THE INVENTION

The present invention provides a system that spray marks animals according to a pre-set selection weight. The system includes a pen area partitioned into a feeding area containing a first group of feeders and a common watering area accessed by the animals passing through a walk-through weighing scale.

The walk-through scale provides an unrestricted passageway from the common watering area back into the feeding area and vice versa. The walk-through scale has one side open to the watering area and the other side open to the feeding area. The scale measures the weight of each animal as the animal passes through the passageway from either direction. For example, if the animal is passing from the watering area to the feeding area, the inlet of the scale will be the side open to the watering area and the outlet of the scale will be the side open to the feeding area.

The scale will determine the animal weight and compare the weight against a pre-set selection weight. If the pre-set weight is exceeded, the scale will activate a spray marking device to distribute a liquid dye onto the animal's back. If the animal weight does not exceed the pre-set weight, the animal passes through the weigh scale without any action.

The scale determines the animal's weight as the animal's center of mass crosses the center of the weighing platform. If two animals are on the scale platform in series and their combined weight exceeds the pre-set weight, then one animal will be spray marked on the head and the other will be marked on the tail end of the animal. These animals will be visually determined to be mis-marked and will not be selected by the workers sorting animals.

The scale platform is equipped with a passage way that is designed to fit growing animals (specifically pigs). The passage way profile is defined by information provided by Bernard Peet, Pork Industry Consultant, Lacombe, Canada and published by The Pig Site on Jun. 20, 2003. The table below demonstrates the geometric measurements of a growing pig as a function of the pig weight. The shoulder width and height as a function of the animal's weight were used to establish the passageway profile. This profile is necessary to allow a single animal to pass through the scale passageway at a time. There are no additional panels needing adjustment to restrict the passageway to fit a single animal and therefore no additional labor is necessary to operate the marking scale.

TABLE 1

Shoulder width and height dimensions for pigs

| Weight (kg) | Shoulder width (cm) | Shoulder height (cm) |
| --- | --- | --- |
| 5 | 10.9 | 27.2 |
| 10 | 13.7 | 34.2 |
| 20 | 17.2 | 43.0 |
| 30 | 19.7 | 49.2 |
| 40 | 21.6 | 54.1 |
| 50 | 23.3 | 58.2 |
| 60 | 24.7 | 61.8 |
| 70 | 26.0 | 65.0 |
| 80 | 27.2 | 67.9 |
| 90 | 28.3 | 70.6 |
| 100 | 29.3 | 73.1 |

The pass-through weigh scale is recommended to be placed permanently in the pen, so that the weigh scale is part of the animal's growing environment. If the weigh scale is placed into the pen during the growing cycle, it will disrupt the animal growth and behavior which will create inconsistencies in spray marking of animals. This disruption in animal growth will cause unnecessary stress on the animal. The other reason for making the weigh scale permanent in the pen is to ensure that the weigh scale is not damaged in transport and movement. Calibration of the weigh scale is necessary to verify accurate operation of the spray marking scale system.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A livestock management system for marking animals based on weight according to the present invention will be described in detail with reference to FIGS. 1 to 7 of the accompanying drawings.

Figure 1:
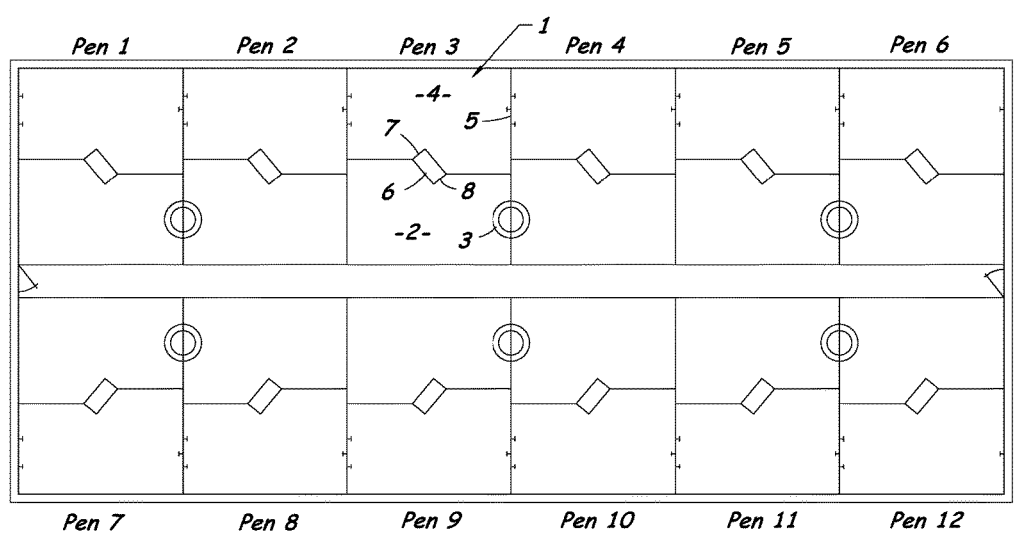
FIG. 1 is a plan view of a livestock pen layout with a marking scale positioned between a feeding area and a watering area.
Figure 2:
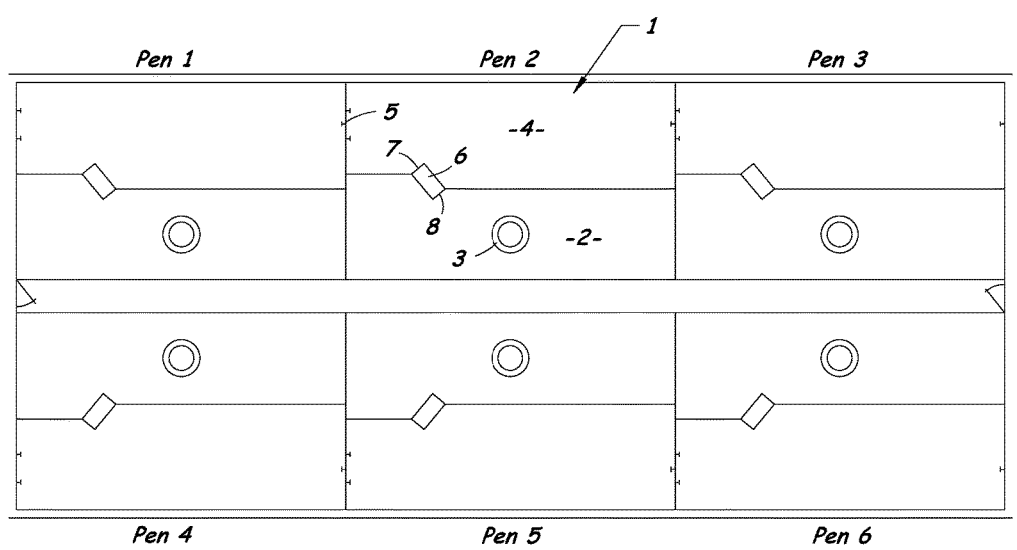
FIG. 2 is another plan view of a livestock pen layout with a marking scale positioned between a feeding area and a watering area.

FIGS. 1 and 2 illustrate animal pen layouts having a marking scale positioned according to the present invention. The system includes a pen area 1 partitioned into a first feeding area 2 containing at least one feeder 3 and a common watering area 4 containing at least one waterer 5. A walk-through scale 6 has one side 7 open to the watering area and the other side 8 open to the feeding area. Animals are allowed to pass through the marking scale from either direction.

Figure 3:
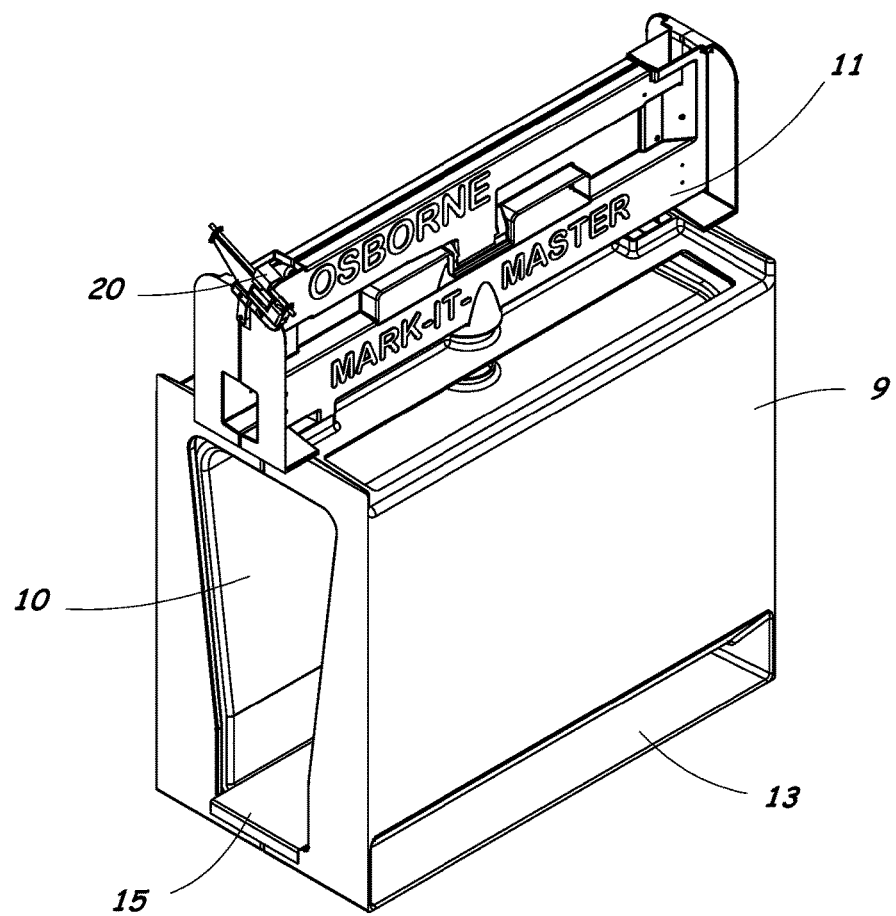
FIG. 3 is a perspective view of a marking scale used in the present invention.

The marking scale shown in FIG. 3 has an outer frame 9 with an inner basket 10 supported by the weighing arms located behind the top cover 11. A spray can 12, or similar liquid spray device, is located above the center of the marking scale. When the pre-set weight of the marking scale is exceeded by the animal being weighed, the weigh arm mechanism or electronic control activates the spray device to distribute a liquid dye on the back of the animal. The marking scale is mounted to the floor using the mounting plate 13 area to match with either slots in the flooring or predetermined anchor locations.

Figure 4:
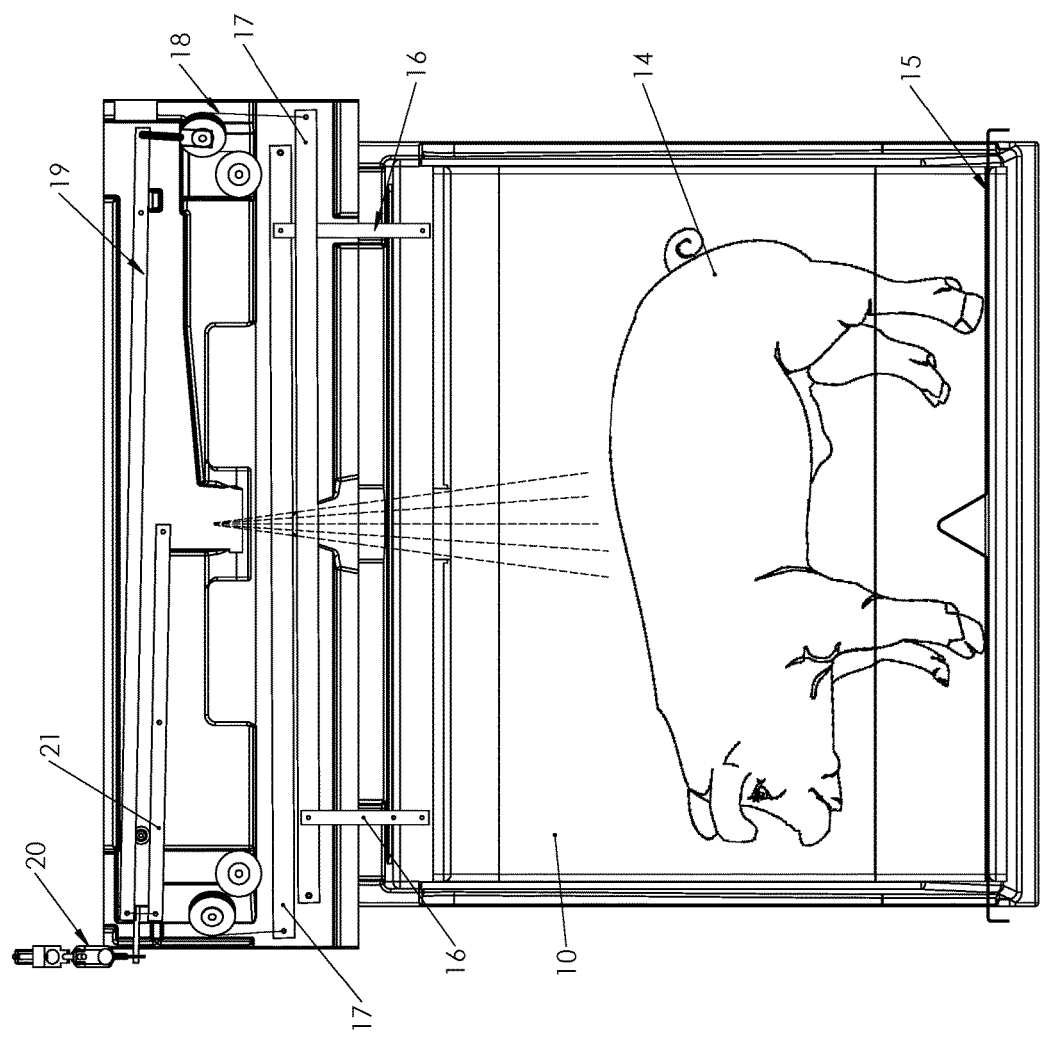
FIG. 4 is a cutaway side elevation view of the marking scale showing a pig being weighed and marked.

FIG. 4 shows an animal 14 inside of the inner basket 10 which is supported by hanging links 16 connected to weigh arms 17. The weigh arms 17 are connected to a cable pulley system 18 that allows the scale platform weight to be transferred to the upper weigh arm 19. When the total weight of the animal 14 on the platform scale exceeds the pre-set counter weight 20 that is adjustable, the upper weigh arm 19 pivots upward and moves the lower activation arm 21 to contact the spray activation device 22 to depress the spray can 12 nozzle to distribute a marking dye onto the back of the animal 14. The scale platform has an anti-lying plate 15 permanently mounted on the bottom of the inner basket 10 to prevent animals from lying down in the scale and preventing other animals from passing through the scale.

A mechanical weighing mechanism suitable for use in the present invention is described in U.S. Pat. No. 6,838,625 of Jerry L. Ostermann.

Figure 5:
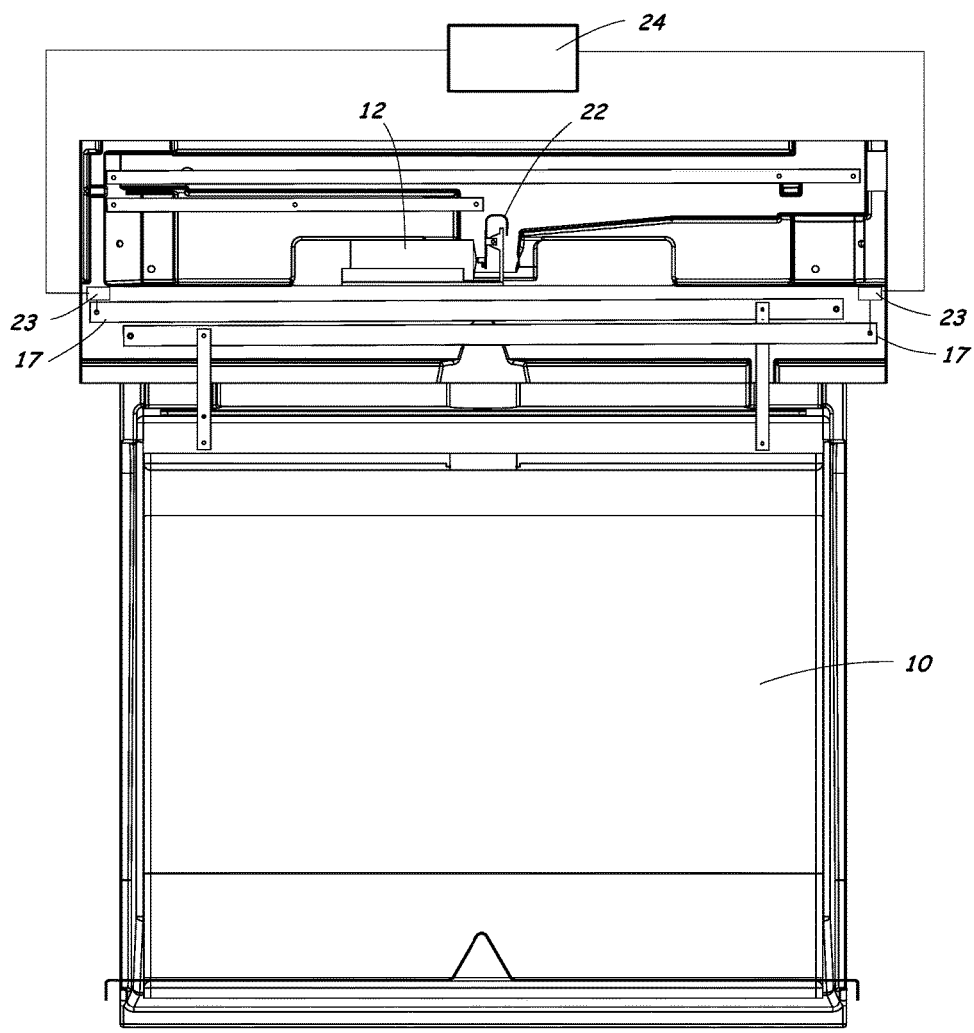
FIG. 5 is another side elevation view of the marking scale.

An alternative weighing device to the mechanical weighing mechanism described above is the use of two load cells 23 as shown in FIG. 5. The weigh arms 17 are connected to load cells 23 that are interfaced to an electronic control 24 to compare weight readings. When the weight readings from the two load cells 23 are equal or substantially equal, the animal is determined to be centered in the inner basket 10. This will signal that the electronic control 24 can perform its functions.

When the equal or substantially equal load cell readings are provided to the electronic control 24, the electronic control system 24 will sum the two weight readings to produce a combined weight reading for the animal. The combined weight reading is then compared to a pre-set marking weight entered into the electronic control system 24 by the user. This pre-set weight can be set at any desired value based on what animal weights are to be marked. If the combined weight reading exceeds the pre-set marking weight set by the user, the electronic control system 24 will signal the spray activation device 22 to depress the spray can 12 nozzle or other spray mechanism to distribute a marking dye onto the back of the animal.

Figure 6:
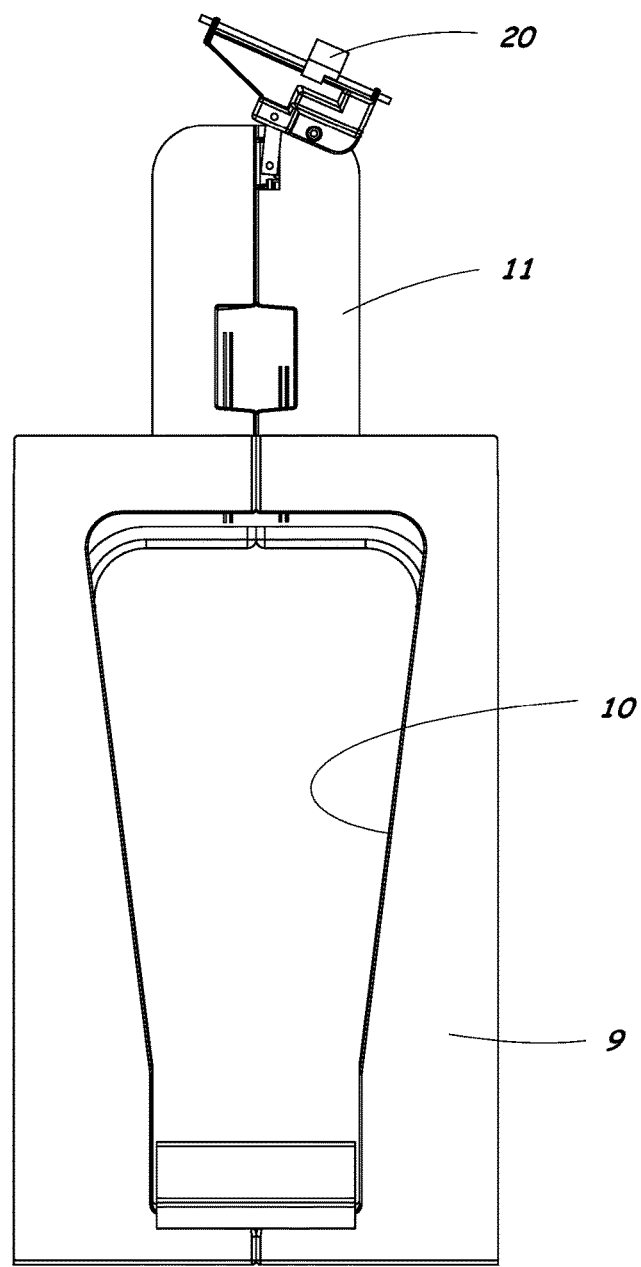
FIG. 6 is an end view of the marking scale showing a geometry of the passage through the sale that allows only a single animal at a time on the scale.

FIG. 6 shows the entrance profile of the outer frame 9 and inner basket 10 to automatically accommodate the width and height of the animal as it grows. The profile is based on geometrical animal measurements take by Bernard Peet, as mentioned above. The importance of this pre-defined entrance geometry is to allow a single animal onto the scale at a time regardless of animal age and ensure that only a single animal is marked when the weigh mechanism recognizes a marking condition.

It is possible for multiple animals to be on the scale platform at the same time, but these animals will be in series (one animal behind another or two animals facing one another). If the combined weight measured by the weighing mechanism exceeds the pre-set marking weight, both animals will be spray marked on either the head or rear end of the animal. The workers will be easily able to identify these animals as mis-marked animals and ignore any markings.

Figure 7:
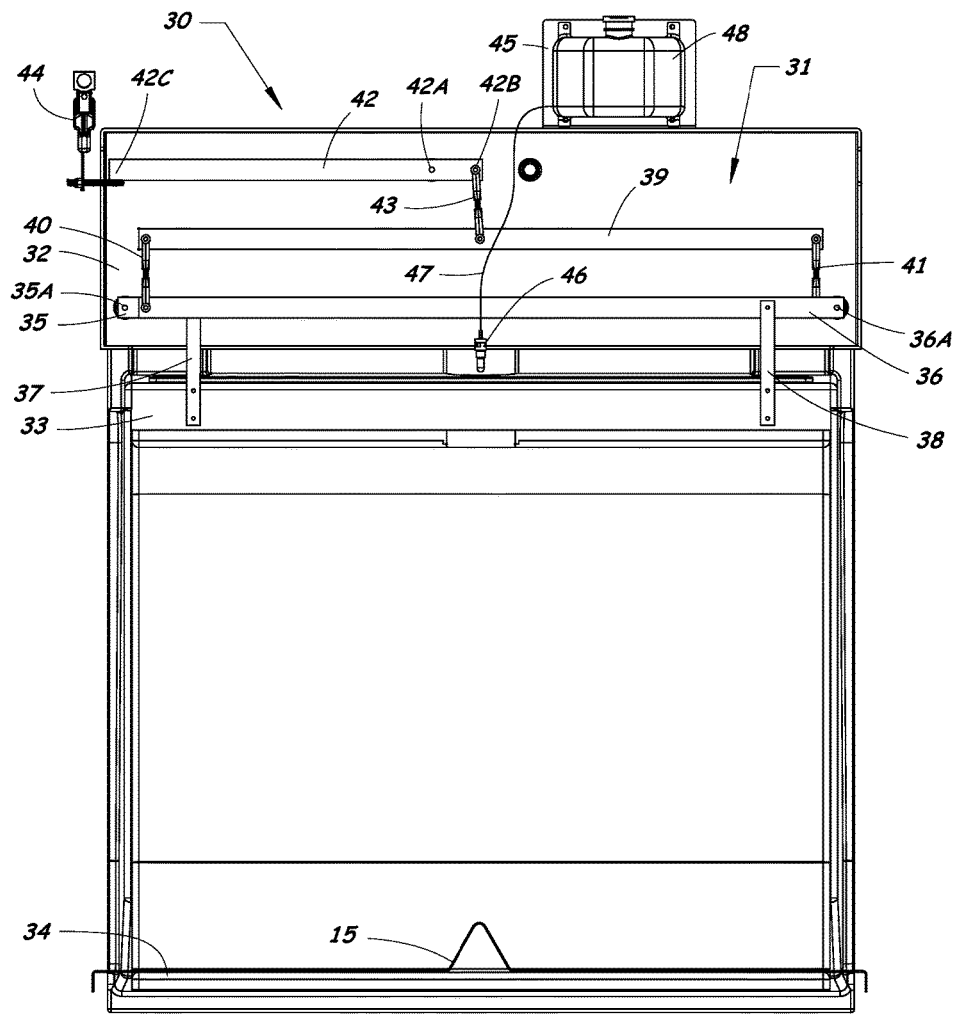
FIG. 7 is a side elevation view of a marking scale according to another embodiment of the present invention.

FIG. 7 illustrates a marking scale 30 according to another embodiment of the present invention. The marking scale 30 in this embodiment uses a weighing mechanism 31 with weigh bars linked together instead of using a cable and pulley system.

The marking scale 30 in FIG. 7 includes an outer frame 32 and an inner basket 33 with a weighing platform 34 supported from the frame 32 by the weighing mechanism 31. The weighing mechanism 31 has first and second lower weigh arms 35, 36 pivotally connected at points 35A, 36A to the frame 32. The lower weigh arms 35, 36 are arranged side-by-side. First and second hanging link members 37, 38 are connected between the first and second lower weigh arms 35, 36 and the weighing platform 34. The first and second hanging link members 37, 38 are spaced apart from each other in a longitudinal direction. A middle weigh bar 39 is positioned above the lower weigh arms 35, 36. Third and fourth hanging link members 40, 41 are pivotally connected between the first and second lower weigh arms 35, 36 and respective ends of the middle weigh bar 39. An upper weigh arm 42 is pivotally connected to the frame 32 at point 42A. A fifth link 43 is pivotally connected between an inner end 42B of the upper weigh arm 42 and a midpoint 39A on the middle weigh bar 39.

An adjustable counterweight mechanism 44 is connected to an outer end 42C of the upper weigh arm 42. The lower weigh arms 35, 36, middle weigh bar 39, the link members 37, 38, and the link members 40, 41 allow the scale platform weight to be transferred via the link 43 to the upper weigh arm 42. The pivot points 35A, 36A for the lower weigh arms 35, 36, and the pivot point 42A for the upper weigh arm 42 are arranged to reduce the amount of force needed to be applied to the counterweight mechanism 44 at the outer end of the upper weigh arm 42 so that the counterweight mechanism 44 need only have a fraction of the mass of the animals to be weighed on the scale 30.

A spray mechanism 45 has a spray nozzle 46 located above the center of the marking scale 30. The spray mechanism 45 is provided to selectively mark animals that pass through the scale 30. The spray nozzle 46 is connected by a tube 47 to a spray pump and reservoir 48 located on top of the scale 30 for convenient inspection and maintenance. When the pre-set weight of the marking scale 30 is exceeded by the animal being weighed, the weighing mechanism 31 or an associated electronic control activates the spray mechanism 45 to distribute a liquid dye on the back of the animal.

When the total weight of the animal on the weighing platform 34 exceeds the preset weight setting of the counterweight mechanism 44, the upper weigh arm 42 pivots upward at its outer end and moves an activation device associated with the counterweight mechanism 44 to activate the spray mechanism 45. The weighing platform 34 has an anti-lying plate 49 permanently mounted on the bottom of the weighing platform 34 to prevent animals from lying down in the scale 30.

The livestock weight marking system of the present invention provides the user fully automated means to spray mark animals at a pre-set selection weight in a non-stressful environment, thereby improving animal selection accuracy, resulting in premiums being paid by packing houses, reducing interruption in animal growth due to sorting stress, and reducing labor to sort and mark animals ready for market.

While the invention has been specifically described in connection with specific embodiments thereof, it is to be understood that this is by way of illustration and not of limitation, and the scope of the appended claims should be construed as broadly as the prior art will permit.

What is claimed is:

1. A livestock management system, comprising:
a pen having a feeding area containing at least one feeder and a watering area containing at least one waterer;
a walk-through scale providing an unrestricted open passageway between the feeding area and the watering area, said walk-through scale having a first side open to the watering area, a second side open to the feeding area, a weighing platform arranged between said first and second sides, and a weighing device that determines the weight of an animal as a center of mass of the animal crosses a center of the weighing platform, said scale having a means for determining if a weight of the animal is above or below a pre-set weight; and
a marking mechanism associated with said scale for marking animals above or below said pre-set weight.

2. The livestock management system according to claim 1, wherein said means for determining comprises a means for determining if a weight of the animal exceeds said pre-set weight, and said marking mechanism marks animals that exceed said pre-set weight.

3. The livestock management system according to claim 1, wherein said marking mechanism comprises a spray marking device that can be activated to distribute a liquid dye onto an animal.

4. The livestock management system according to claim 3, wherein said spray marking device is located above the center of said weighing platform.

5. The livestock management system according to claim 1, wherein said weighing device is a mechanical weighing mechanism.

6. The livestock management system according to claim 1, wherein said weighing device comprises a pair of weigh arms connected to a pair of load cells interfaced to an electronic control.

7. The livestock management system according to claim 6, wherein said electronic control compares weight readings from said load cells, and when said weight readings are substantially equal the readings are summed to determine the weight of the animal as the center of mass of the animal crosses the center of the weighing platform.

8. The livestock management system according to claim 1, wherein said scale comprises a weighing basket having a floor and right and left sidewalls extending above the floor, said floor and sidewalls together defining a passage profile having a geometry that allows only a single animal to enter the scale at a time.

9. The livestock management system according to claim 8, wherein said sidewalls diverge outwardly and upwardly from each other with lower portions of the sidewalls being closer together than upper portions of the sidewalls.

10. The livestock management system according to claim 9, wherein said passage profile dimensions are established based on shoulder width and height of a particular species of livestock as a function of weight of the species.

11. The livestock management system according to claim 10, wherein said species are pigs.

12. A walk-through scale for weighing livestock, comprising:
   a frame assembly;
   a weighing platform having an entrance end and an exit end;
   a weighing mechanism comprising a counterweight assembly with an adjustable weight selection device, and a hanging assembly for hanging the weighing platform from the frame assembly with a connection to said counterweight assembly;
   said hanging assembly comprising a first lower weigh arm pivotally connected to the frame assembly, a first link member connected between said first lower weigh arm and a first location on said weighing platform, a second lower weigh arm pivotally connected to the frame assembly, a second hanging link member connected between said second lower weigh arm and a second location on said weighing platform, said first and second locations on said weighing platform being spaced apart in a longitudinal direction, a middle weigh bar positioned above the first and second lower weigh arms, third and fourth hanging link members pivotally connected between the first and second lower weigh arms and respective ends of the middle weigh bar, an upper weigh arm having first and second ends and a pivot connection to the frame assembly between said first and second ends, and a fifth hanging link member pivotally connected between the first end of the upper weigh arm and the middle weigh bar; and
   said counterweight assembly being connected to the second end of the upper weigh arm.

13. The walk-through scale according to claim 12, further comprising a marking mechanism for releasing a pigmented spray onto an animal weighed by said scale when a threshold scale weight is exceeded on said weighing platform.

14. The walk-through scale according to claim 13, wherein said marking mechanism is arranged to release the pigmented spray above a center of said weighing platform.

15. The walk-through scale according to claim 12, wherein said weighing mechanism is arranged to determine a weight of an animal as a center of mass of the animal crosses a center of the weighing platform.

16. The walk-through scale according to claim 12, wherein said weighing platform comprises a weighing basket having a floor and right and left sidewalls extending above the floor, said floor and sidewalls together defining a passage profile having a geometry that allows only a single animal to enter the scale at a time.

17. The walk-through scale according to claim 16, wherein said sidewalls diverge outwardly and upwardly from each other with lower portions of the sidewalls being closer together than upper portions of the sidewalls.

18. The walk-through scale according to claim 16, wherein said passage profile dimensions are established based on shoulder width and height of a particular species of livestock as a function of weight of the species.

19. The walk-through scale according to claim 18, wherein said species are pigs.

20. A livestock management system, comprising:
   a pen having a feeding area containing at least one feeder and a watering area containing at least one waterer;
   a walk-through scale having a first side open to the watering area, a second side open to the feeding area, a weighing platform, and a weighing device that determines the weight of an animal as a center of mass of the animal crosses a center of the weighing platform, said scale having a means for determining if a weight of the animal is above or below a pre-set weight; and
   a marking mechanism associated with said scale for marking animals above or below said pre-set weight;
   said walk-through scale further comprising:
   a frame assembly;
   a weighing mechanism comprising a counterweight assembly with an adjustable weight selection device, and a hanging assembly for hanging the weighing platform from the frame assembly with a connection to said counterweight assembly;
   said hanging assembly comprising a first lower weigh arm pivotally connected to the frame assembly, a first link member connected between said first lower weigh arm and a first location on said weighing platform, a second lower weigh arm pivotally connected to the frame assembly, a second hanging link member connected between said second lower weigh arm and a second location on said weighing platform, said first and second locations on said weighing platform being spaced apart in a longitudinal direction, a middle weigh bar positioned above the first and second lower weigh arms, third and fourth hanging link members pivotally connected between the first and second lower weigh arms and respective ends of the middle weigh bar, an upper weigh arm having first and second ends and a pivot connection to the frame assembly between said first and second ends, and a fifth hanging link member pivotally connected between the first end of the upper weigh arm and the middle weigh bar; and said counterweight assembly being connected to the second end of the upper weigh arm.

\* \* \* \* \*